Figure 1:
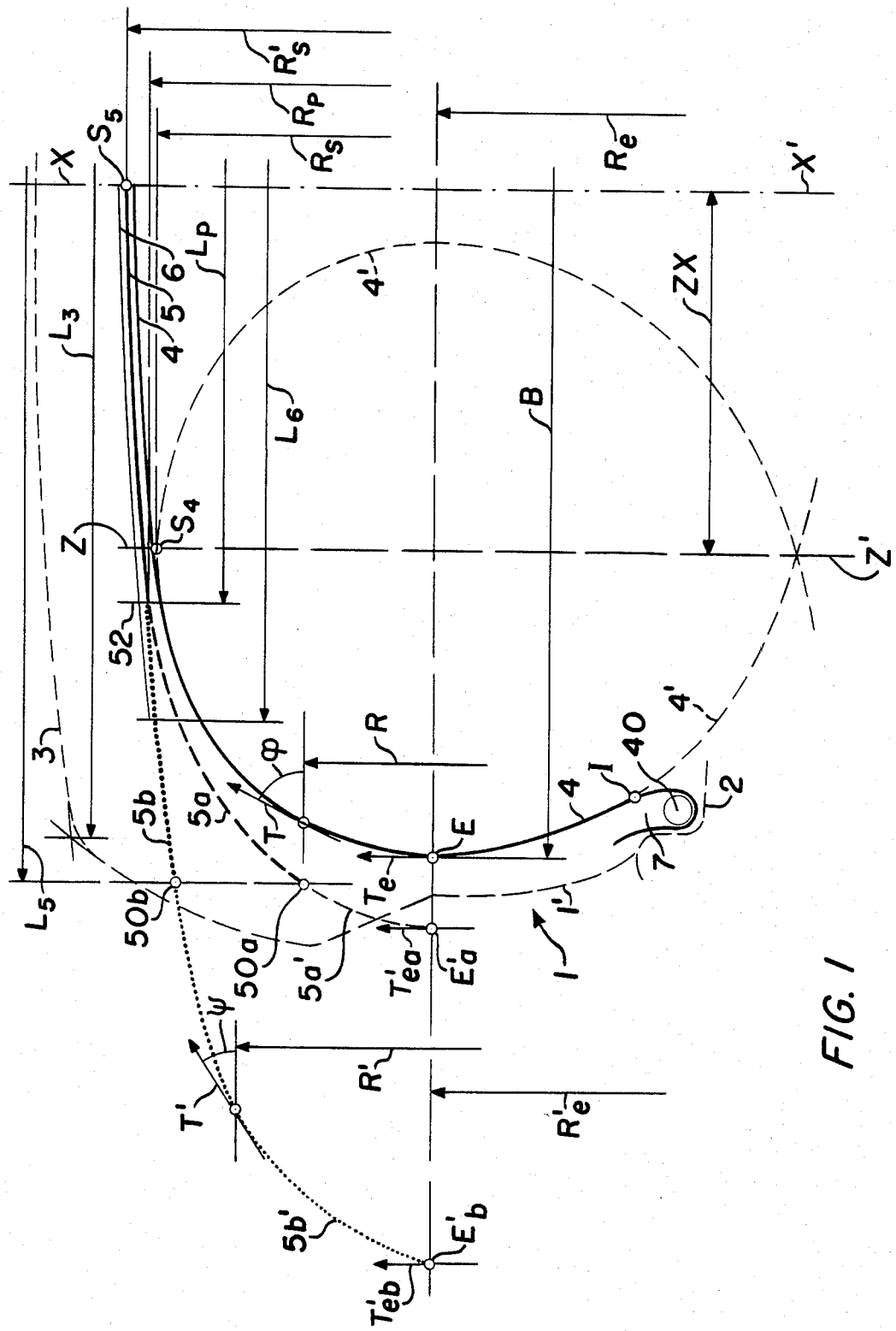

United States Patent [19]

Pommier, deceased

[11] Patent Number: 4,520,856

[45] Date of Patent: Jun. 4, 1985

[54] RADIAL TIRE FOR HEAVY LOADS

[75] Inventor: Jean Pommier, deceased, late of Clermont-Ferrand, France, by Alain Gaston Pommier, heir

[73] Assignee: Compagnie Generale des Establissements Michelin, Clermont-Ferrand, France

[21] Appl. No.: 581,236

[22] Filed: Feb. 17, 1984

Related U.S. Application Data

[63] Continuation-in-part of Ser. No. 363,414, Mar. 30, 1982, abandoned.

[30] Foreign Application Priority Data

Apr. 3, 1981 [FR] France .................... 81 06908

[51] Int. Cl.³ .......................... B60C 3/00; B60C 9/08; B60C 9/20
[52] U.S. Cl. .................... 152/454; 152/537
[58] Field of Search .......... 152/330 R, 352 R, 353 R, 152/353 C, 353 G, 354 R, 354 RB, 355, 356 R, 356 A, 360, 361 R, 361 FP, 361 DM

[56] References Cited

U.S. PATENT DOCUMENTS

| | | | |
|---|---|---|---|
| Re. 30,549 | 3/1981 | Mirtain et al. | 152/361 R |
| 3,554,261 | 1/1971 | Mirtain et al. | 152/361 FP |
| 3,708,007 | 1/1973 | Roberts | 152/361 FP |
| 3,757,844 | 9/1973 | Verdier | 152/361 FP |
| 3,780,783 | 12/1973 | Curtiss, Jr. | 152/356 |
| 4,186,789 | 2/1980 | Verdier | 152/361 R |
| 4,234,031 | 11/1980 | Pommier | 152/356 R |
| 4,282,917 | 8/1981 | Pommier | 152/361 FP |

FOREIGN PATENT DOCUMENTS

| | | | |
|---|---|---|---|
| 102826 | 9/1962 | Netherlands | 152/361 FP |
| 1364426 | 8/1974 | United Kingdom | 152/361 FP |

OTHER PUBLICATIONS

Yoshimura, "Shapes of Pneumatic Tires", International Polymer Science and Technology, vol. 4, No. 8, 1977.

Primary Examiner—Lois E. Boland
Attorney, Agent, or Firm—Brumbaugh, Graves, Donohue & Raymond

[57] ABSTRACT

In order to reduce the heating at the edges of the tread reinforcement plies, the additional working ply has an axial width which is between 1.05 times the axial width of the tread and 1.1 times the maximum axial width of the radial carcass reinforcement. The cables of this additional working ply follow a geodesic trace and form an angle of between 25° and 65° with the equatorial plane of the tire.

13 Claims, 6 Drawing Figures

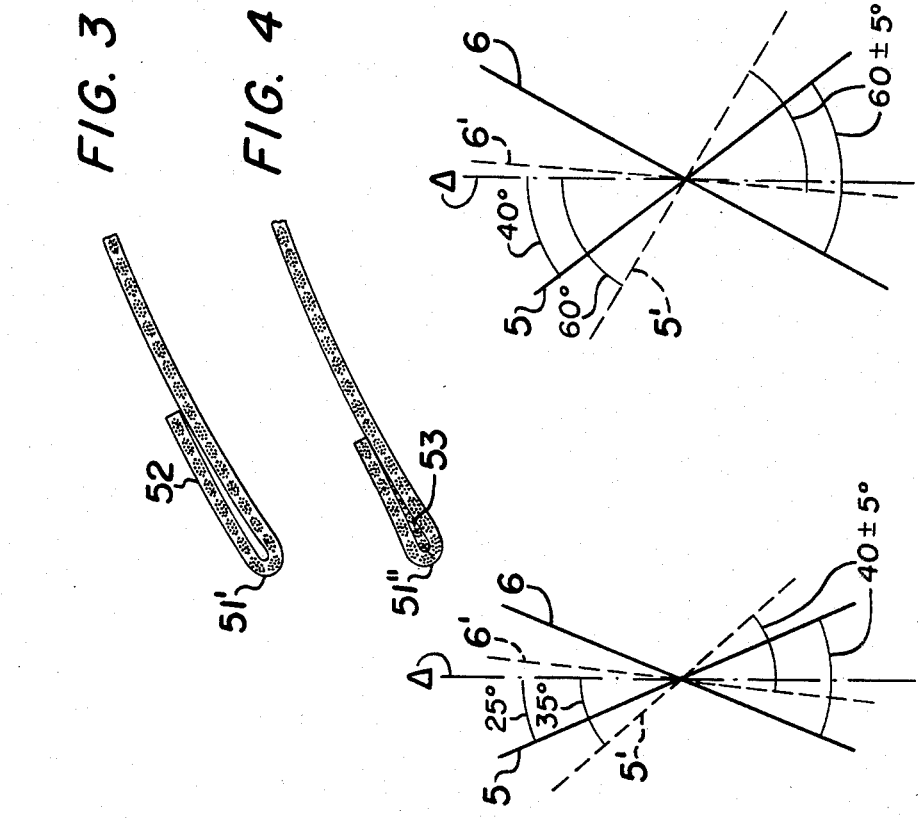
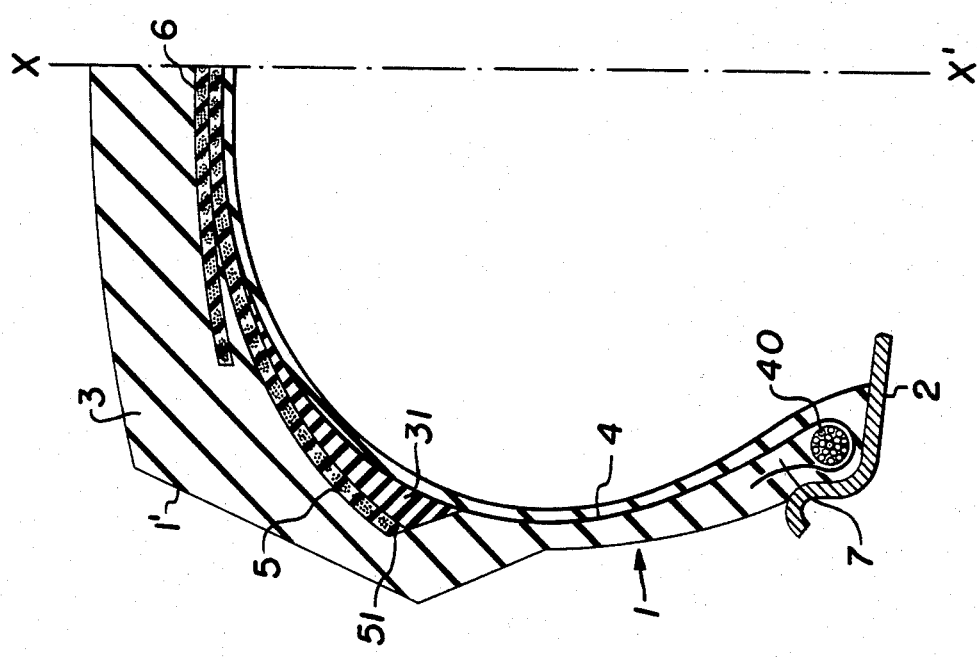

RADIAL TIRE FOR HEAVY LOADS

This application is a continuation-in-part application of U.S. application Ser. No. 363,414, filed Mar. 30, 1982, now abandoned.

The present invention concerns tires having a carcass reinforcement formed of at least one ply of radial cables anchored to at least one bead ring in each bead and a tread reinforcement arranged radially outward of the carcass reinforcement and approximately parallel to the latter along an area centered on the equator, which tread reinforcement is formed of at least two plies of cables which are parallel in each ply and crossed from one ply to the other, one tread ply being wider than the other or others.

The tread reinforcement of radial tires, particularly those intended for heavy and very heavy carrier vehicles, comprises essentially two crossed plies, preferably of cables of slight elongation, forming small angles with respect to the circumferential direction of the tire. These two essential plies have been given the name of working plies. In order to increase the rigidity of the tread reinforcement, the latter may also contain a ply which is more strongly inclined to the circumferential direction, thus triangulating the working plies, and arranged radially inwards of them. Furthermore, in order to protect the tread reinforcement, protective plies of elastic cables can be arranged radially outward of the said basic reinforcement.

Ordinarily, one of the two working plies is wider than the other, except in the event that one of these working plies has its edges turned over around the ends of the other. The portions of the wider working ply which protrude beyond the other working ply have essentially the function of providing a transition zone between the rigid portion of the tread reinforcement and the rest of the crown of the tire. As a result, the width of the active (rigidified) portion of the tread reinforcement coincides with the width of the narrower of the two working plies. For this reason, it is agreed to call this working ply the active ply, the other working ply being accordingly referred to as the additional ply.

French Pat. No. 2,452,390 (U.S. Pat. No. 4,282,917) provides a width of active ply which is between 55%, for an aspect ratio H/B of the tire close to 1, and 85%, for an aspect ratio H/B of the tire close to 0.5, of the maximum axial width B of the tire, H being the radial height of the tire on the wheel rim.

The additional ply is generally arranged radially inward of the active ply and its width ordinarily exceeds that of the active ply by 10% to 25%. The heating is maximum at the location of the ends of the additional ply and of the rubber mix contained between these ends and the carcass reinforcement, which corresponds to the maximum thickness of the radial section of the tire. When the load, the pressure and the speed are different from those for which the tire has been designed, this heating reaches or exceeds the critical value beyond which the life of the tire is jeopardized. The rubber mix surrounding the ends of the additional ply starts to be destroyed. This degradation continues both in the direction towards the carcass reinforcement and in the direction towards the ends of the active ply, from where it can propagate in the direction towards the equatorial plane and/or reach the adjacent tread plies, particularly when the tire in question is used on rough ground, for instance off the road.

The problem consists in decreasing the vulnerability of large and very large carrier tires of the type in question—particularly when they are traveling off the road—to higher loads and/or speeds without decreasing the active width of the assembly consisting of the two working plies.

Thus the invention relates to a tire for heavy and very heavy carrier vehicles, possibly traveling off the road, having a carcass reinforcement formed of at least one ply of radial cables anchored to at least one bead ring in each bead and a tread reinforcement comprising essentially two superimposed plies, known as working plies, formed of cables of low extensibility which are parallel in each ply and crossed from one ply to the other, forming acute angles with the circumferential direction of the tire, these plies being, on the one hand, of different axial widths so that the axially narrowest ply has a width less than that of the tread and, on the other hand, parallel to the carcass reinforcement along a zone of parallelism of a width less than that of the narrowest ply, the carcass reinforcement following its natural equilibrium meridian profile approximately from the edges of the zone where the two tread plies are parallel to the carcass reinforcement up to at least the points where the latter reaches its maximum axial width, characterized by the fact that:

when the tire is mounted on its rim and uninflated, the cables of the narrowest working ply, known as an active ply, form, as known per se, an angle of between 15° and 35° with the equatorial plane of the tire;

the other working ply, known as an additional ply, has an axial width between 1.05 times the axial width of the tread and 1.1 times the maximum axial width of the carcass reinforcement;

the cables of the additional ply form with the equatorial plane of the tire an angle $\alpha_o$ greater than and of opposite direction to that of the cables of the active ply and being between 25° and 65°;

the cables of the additional ply follow a geodesic path from one edge to the other of said ply;

the meridian profile of the additional ply is defined by the relationship $$\cos \psi = \frac{R'^2 - R'^2_e}{R'^2_s - R'^2_e} \cdot \frac{R' \sin \alpha_o}{\sqrt{R'^2 - R'^2_s \cos^2 \alpha_o}}$$

the meridian curvature $1/\rho_o$ of the additional ply, at the place where it intersects the equatorial plane, is defined by the relationship $$\frac{1}{\rho_o} = \frac{2 R'_s}{R'^2_s - R'^2_e} - \frac{\text{ctg}^2 \alpha_o}{R'_s}$$

$\psi$ designates the angle which is formed by the tangent to the trace of the additional ply at the running point of radius $R'$ with a line parallel to the axis of rotation of the tire; $R'_e$ is between 0.8 and 1.2 times the radius of the point of the carcass reinforcement where the latter reaches its maximum axial width; $R'_s$ is the radius of the point where $\psi$ is equal to zero; the radii $R'$, $R'_e$ and $R'_s$ are measured from the axis of rotation of the tire;

and the trace of the natural equilibrium meridian profile of the carcass reinforcement follows tangentially the curvature of the zone of parallelism from the edge of the zone of parallelism.

The cables of the additional ply in accordance with the invention are arranged, along geodesic paths, on a profiled member of rubber mix which separates them from the carcass reinforcement. The result is that each cable is arranged at every point in a plane normal to the profiled member and is subjected by the inflation of the tire only to stresses which are normal to the geodesic path. This has the advantage that the curvature of the cable increases gradually in the direction towards its ends without ever decreasing and that the cable is subjected to a constant tension.

The invention covers the following preferred variants:

(a) the active ply is arranged radially outwards of the additional ply.

(b) The carcass reinforcement follows, as known per se, its natural equilibrium meridian profile up to the vicinity of the beads.

It is pointed out that the natural equilibrium meridian profile of a radial carcass reinforcement is defined by the relationship $$\cos \phi = \frac{R^2 - R_e^2}{R_s^2 - R_e^2}$$

In this relationship, R is the radius with respect to the axis of rotation of the tire from the point of the neutral fiber of the radial carcass reinforcement where the tangent to the natural equilibrium meridian profile followed by this neutral fiber forms an angle $\phi$ with a line parallel to the axis of rotation of the tire passing through this point, $R_e$ is the radius of the point where the radial carcass reinforcement reaches its greatest axial width, $R_s$ is the radius of the point where the natural equilibrium meridian profile or its theoretical extension has a tangent parallel to the axis of rotation of the tire. Furthermore, at the level of the edges of the zone of parallelism between the two working plies of the invention, on the one hand, and the radial carcass reinforcement, on the other hand, the tangent to the neutral fiber of the radial carcass reinforcement is parallel to the tangents to the working plies.

(c) The meridian trace of the additional ply or the theoretical extension of this trace axially outward of the edge of the additional ply has an axial equatorial radius $R'_e$ equal to the radius $R_e$ of the point of the carcass reinforcement where the latter reaches its maximum axial width.

(d) The additional ply has at least one folded edge when the tread is provided, at least in the corresponding marginal zone, with oblique or transverse blocks separated by deep wide grooves. The folded portion preferably has a width of between 10% and 30% of the edge-to-edge developed width of the additional ply as seen in meridian section. The folded portion can also be replaced by a narrow ply which extends along the edge of the additional ply.

Furthermore, an annular reinforcement element, which can consist of a very narrow ply of cables which are very slightly inclined by at most 10° with respect to the circumferential direction, can be arranged within the fold of the additional ply or extend along the folded or unfolded edge of the additional ply. However, the additional ply may also comprise, as sole edge, the said very narrow ply of very slightly inclined cables.

(e) The arrangement of the additional ply of the invention makes it possible to use unusually high angles for this working ply without disadvantage. Thus for the use of the tire on very heavy carrier vehicles traveling on a road or a prepared track, the angle of the cables on the additional ply at the equator is between 25° and 35° and the angle formed by the cables of the active ply with the cables of the additional ply is equal to 40°±5°. Or else, for the use of the tire on vehicles traveling off the road on very rough terrain, the angle of the cables of the additional ply at the equator is between 40° and 60° and the angle formed by the cables of the active ply with the cables of the additional ply is equal to 60°±5°.

One embodiment of the invention is shown schematically in the accompanying drawing to which the following description refers.

This drawing shows:

in FIG. 1 a dimensional diagram of the lefthand half of a tire according to the invention;

in FIG. 2 a more detailed view of this half of the tire;

in FIGS. 3 and 4 two particular arrangements of the edges of the additional ply; and in FIGS. 5 and 6 the preferred angles of the active and additional plies with respect to the circumferential direction at the equator of the tire.

The meridian section of the left-hand half of the tire 1 of the invention (FIG. 1) is symmetrical with that of the right-hand half (not shown) with reference to the equatorial plane of trace XX' on the plane of the drawings. In this diagrammatic view, only the parts essential for an understanding of the relations between the dimensions of the components of the tire which are defined within the scope of the invention have been shown in the drawing.

The uninflated tire 1, whose outer contour 1' is shown in long dashes, is mounted on its standard rim 2, only the outer contour of the seat and corresponding flange of which have been shown. This tire has a tread 3 of axial width $L_3$, a carcass reinforcement 4 of maximum axial width B and a tread reinforcement comprising two superimposed working plies 5 and 6 in accordance with the invention.

The active working ply 6, which is the narrower of the two plies 5 and 6, is arranged radially outward of the additional working ply 5. The meridian trace of the additional ply 5 in accordance with the invention is shown in solid line in the zone of parallelism of width $L_p$ between, on the one hand, the two working plies 5 and 6 and, on the other hand, the carcass reinforcement 4. Axially outward of this zone of parallelism $L_p$ the meridian trace of the additional ply 5 is represented by thick dotted line 5b for an angle $\alpha_o$ of 25° of the cables of this ply with the equatorial plane of the tire of trace XX' and by thick dashed line 5a for an angle $\alpha_o$ of 60° with this same plane. The active ply 6 has an axial width $L_6$ less than the axial width $L_3$ of the traced but greater than the width $L_p$ of the zone along which the two working plies 5 and 6 are parallel to the carcass reinforcement 4. In accordance with the invention, the additional ply 5 (represented by thick dotted line 5b or by thick dashed line 5a axially outward of the zone of parallelism $L_p$) has a width $L_5$ which is between 1.05 times the axial width $L_3$ of the tread 3 and 1.1 times the maximum axial width B of the carcass reinforcement 4.

Beyond the edge 50a (50b) of the additional ply 5a (5b) the (theoretical) extension of the meridian trace of the additional ply 5 is shown by thin dotted line 5b' for the cable angle $\alpha_o$ of 25° and by thin dashed line 5a' for the cable angle $\alpha_o$ of 60° up to the axial equator points $E'_b$, $E'_a$ of radius $R'_e$, where these traces have tangents $T'_{eb}$ and $T'_{ea}$ parallel to the equatorial plane of trace XX'.

The radially outer face of the mass of elastomer mix 31 (FIG. 2), which mass is contained between the end 51 of the additional ply 5 and the carcass reinforcement 4 and is in contact with the additional ply 5, is profiled (in meridian section) pursuant to the invention in accordance with the relationship $$\cos \psi = \frac{R'^2 - R'^2_e}{R'^2_{s2} - R'^2_e} \cdot \frac{R' \sin \alpha_o}{\sqrt{R'^2 - R'^2_{s2} \cos^2 \alpha_o}}$$

In this relationship, which is also saitisfied by the meridian section of the additional ply 5 (FIG. 1), $\psi$ is the angle formed by the tangent T' to the additional ply 5 (in this example by the tangent to the theoretical extension 5b') with a line parallel to the axis of rotation (not shown) of the tire 1 at the running point of radius R' with respect to the same axis; R'$_e$ is the radius, with respect to the same axis, of the axial equator point E'$_b$ (E'$_a$) where the theoretical extension 5b' (5a') of the additional ply 5 has a tangent T'eb (T'ea) parallel to the trace XX' of the equatorial plane. However, the invention also comprises the case in which the additional ply 5a (5b) itself (and not its extension) has a tangent parallel to the trace XX' of the equatorial plane, that is to say the case in which, for instance, the axial equator point E'$_a$ ( E'$_b$) merges with the edge 50a (50b) of the additional ply 5 located at a distance $L_5/2$ from the trace XX' of the equatorial plane.

The corresponding outer contour 1' (FIG. 2) of the tire 1 is developed in such a manner that the edges 51 of the additional ply 5 are always embedded in the elastomer mix of the tire. The active ply 6 and the additional ply 5 are preferably reinforced by practically inextensible steel cables (relative extensibility less than 0.2% to 10% of the rupture force).

FIG. 1 shows the preferred arrangement, in which R'$_e$, the axial equator radius of the additional ply, is equal the R$_e$, the axial equator radius of the point E of the carcass reinforcement 4 with tangent T$_e$ parallel to the trace XX' of the equatorial plane. The advantages of the trace of the additional ply 5 in accordance with the invention are still retained for an axial equator radius R'$_e$ which is between 0.8 and 1.2 times the axial equator radius R$_e$ of the carcass reinforcement 4.

In accordance with the invention, the neutral fiber of the carcass reinforcement 4 follows its natural equilibrium meridian profile defined by the relationship $$\cos \phi = \frac{R^2 - R_e^2}{R_s^2 - R_e^2}$$

radially outwards of its axial equator point E (of radius R$_e$) up to approximately the edge 52 of the zone of parallelism L$_p$ between the tread reinforcement (5, 6) in accordance with the invention and the carcass reinforcement 4. FIG. 1 shows the more general case in which the radial equator point S$_4$ of radius R$_s$ of the neutral fiber of the carcass reinforcement 4 or of its theoretical extension 4' differs from the edge 52 of the said zone of parallelism L$_p$, that is the say case in which the axial distance ZX from the axis of symmetry ZZ' of the neutral fiber of the carcass reinforcement 4 and of its theoretical extension 4' differs from the axial distance $L_p/2$ of the edge 52 from the zone of parallelism. In the example shown, the axial distance of the radial equator point S$_4$ of the theoretical extension 4' of the carcass reinforcement 4 from the equatorial plane of trace XX' of the tire is less than half $L_p/2$ of the axial width of the said zone of parallelism. However, the radial equator point S$_4$ of the carcass reinforcement 4 may be situated at the same axial distance $L_p/2$ from the trace XX' of the equatorial plane as the edge 52 of said zone of parallelism.

At the edge 52 of the zone of parallelism L$_p$, the tangent (not shown) to the tread reinforcement (5, 6) is practically parallel to the tangent (not shown) to the natural equilibrium meridian profile of the carcass reinforcement 4.

In accordance with a preferred variant, the cables of the additional ply 5 follow a geodesic trace from one edge 50a (50b) to the other edge of this ply 5. On the one hand, the meridian curvature $1/\rho_s$ at the radial equator point S$_5$ (intersection of this trace with the trace XX' of the equatorial plane of the tire 1) of radius R'$_s$ of the additional ply 5 satisfies the relationship $$\frac{1}{\rho_s} = \frac{2R'_s}{R'^2_s - R'^2_e} - \frac{ctg^2 \alpha_o}{R'_s}$$

On the other hand, at the edge 52 of the zone of parallelism L$_p$ the tangent to the natural equilibrium meridian profile of the carcass reinforcement 4 is parallel to the tangent to the geodesic trace of the cables of the additional ply 5 as defined above. The active ply 6 is, of course, adjacent the additional ply 5 up to an axial distance from the trace XX' of the equatorial plane which may be greater than the half width $L_p/2$ of the zone of parallelism between the tread reinforcement (5, 6) and the carcass reinforcement 4 and, for instance, equal to the half width $L_6/2$ of the active ply 6.

The tread reinforcement of the invention may also cooperate with a pair of narrow plies which limit the expansion of the carcass reinforcement and are arranged between the carcass reinforcement and the tread reinforcement in accordance whith French Pat. No. 2,419,180 (U.S. Pat. No. 4,271,891).

Radially inward of the axial equator point E of the carcass reinforcement 4, the latter follows its natural equilibrium meridian profile up to the point I adjacent the bead 7 of the tire 1 and then turns, for anchoring, around the bead ring 40 of the bead 7.

The carcass reinforcement 4 is preferably formed of a single ply of steel cables. When this carcass reinforcement 4 is formed of several adjacent plies, it is agreed that the natural equilibrium meridian profile of its neutral fiber is equidistant both from the outermost ply and from the innermost ply.

In accordance with FIG. 3, the edge 51' of the additional ply 5 in accordance with the invention has a reinforcement in the form of a folding 52 of the ply on itself. This folding 52 may be effected radially outwards (FIG. 4) or inwards (not shown) around an annular reinforcement 53 formed by a narrow ply of cables which are slightly inclined at at most 10° to the circumferential direction of the tire. The fold 52 may be replaced by a narrow ply of the same size (not shown) of cables forming with the circumferential direction of the tire an angle opposite that formed by the cables of the additional ply 5 and extending along the edge 51' of the latter. The use of such a nonfolded narrow edge ply can be combined with the use of a narrower annular reinforcement, such as the reinforcement 53 above, arranged radially outward or inward of the edge reinforced by the narrow edge ply or between the narrow edge ply and the additional ply 5.

These arrangements (FIGS. 3 and 4) as well as those equivalent ones which, however, have not been shown improve the resistance to undulation of the edges of the tread reinforcement (5, 6) caused by the molding of the tread 3 when the latter comprises, as known per se in the case of tires of the type claimed which are intended for travel off the road, in its marginal zones oblique or transverse blocks (not shown) which are separated by deep wide grooves.

FIG. 5 shows the angle at the level of the equatorial plane of the cables of the additional ply 5 or 5' which is between 25° and 35° with respect to the circumferential direction Δ of the tire or the trace of the equatorial plane (X,X'), which is the preferred angle for the use of the tire of the invention on very heavy carrier vehicles traveling on a road or on a prepared track. The cables of the active ply 6 or 6' then form an angle of 40°±5° with the cables of the additional ply 5 or 5'.

In FIG. 6, the cables of the additional ply 5 or 5' form an angle of between 40° and 60° with respect to the circumferential direction Δ of the tire or the trace of the equatorial plane (X,X') for the use of the latter on vehicles traveling off the road on very rough terrain. The cables of the active ply 6 or 6' then form an angle of 60°±5° with those of the additional ply 5 or 5'.

What is claimed is:

1. A tire for heavy and very heavy carrier vehicles, possibly traveling off the road, having a carcass reinforcement formed of at least one ply of radial cables anchored to at least one bead ring in each bead and a tread reinforcement comprising essentially two superimposed plies, known as working plies, formed of cables of low extensibility which are parallel in each ply and crossed from one ply to the other, forming acute angles with the circumferential direction of the tire, these plies being, on the one hand, of different axial widths so that the axially narrowest ply has a width less than that of the tread and, on the other hand, parallel to the carcass reinforcement along a zone of parallelism of a width less than that of the narrowest ply, the carcass reinforcement following its natural equilibrium meridian profile approximately from the edges of the zone where the two tread plies are parallel to the carcass reinforcement up to at least the points where the latter reaches its maximum axial width, characterized by the fact that:

when the tire is mounted on its rim and uninflated, the cables of the narrowest working ply, known as an active ply, form, as known per se, an angle of between 15° and 35° with the equatorial plane of the tire;

the other working ply, known as an additional ply, has an axial width between 1.05 times the axial width of the tread and 1.1 times the maximum axial width of the carcass reinforcement;

the cables of the additional ply form with the equatorial plane of the tire an angle $\alpha_o$ greater than and of opposite direction to that of the cables of the active ply and being between 25° and 65°;

the cables of the additional ply follow a geodesic path from one edge to the other of said ply;

the meridian profile of the additional ply is defined by the relationship $$\cos \psi = \frac{R'^2 - R'_{e2}}{R'_{s2} - R'_{e2}} \cdot \frac{R' \sin \alpha_o}{\sqrt{R'^2 - R'_{s2} \cos^2 \alpha_o}}$$

the meridian curvature $1/\rho_o$ of the additional ply, at the place where it intersects the equatorial plane, is defined by the relationship $$\frac{1}{\rho_o} = \frac{2 R'_s}{R'_{s2} - R'_{e2}} - \frac{ctg^2 \alpha_o}{R'_s}$$

$\psi$ designates the angle which is formed by the tangent to the trace of the additional ply at the running point of radius $R'$ with a line parallel to the axis of rotation of the tire; $R'_e$ is between 0.8 and 1.2 times the radius of the point of the carcass reinforcement where the latter reaches its maximum axial width; $R'_s$ is the radius of the point where $\psi$ is equal to zero; the radii $R'$, $R'_e$ and $R'_s$ are measured from the axis of rotation of the tire;

and the trace of the natural equilibrium meridian profile of the carcass reinforcement follows tangentially the curvature of the zone of parallelism from the edge of the zone of parallelism.

2. A tire according to claim 1, characterized by the fact that the active ply is arranged radially outward of the additional ply.

3. A tire according to claim 1, characterized by the fact that the carcass reinforcement follows, as known per se, its natural equilibrium meridian profile up to the vicinity of the beads.

4. A tire according to claim 1, characterized by the fact that in the relationship defining the meridian profile of the additional ply, the axial equator radius $R'_e$ is equal to the radius $R_e$ of the point of the carcass reinforcement where the latter reaches its maximum axial width.

5. A tire according to claim 1, characterized by the fact that, as known per se, the tread comprises, in its marginal zones, oblique or transverse blocks separated by deep wide grooves and by the fact that the additional ply has at least one folded edge.

6. A tire according to claim 5, characterized by the fact that the folded portion has a width of between 10% and 30% of the edge-to-edge developed width of the additional ply.

7. A tire according to claim 5 or 6, characterized by the fact that an annular reinforcement element, preferably formed of a ply of cables inclined by at most 10° with respect to the circumferential direction, is arranged within the fold of the additional ply.

8. A tire according to claim 1, characterized by the fact that, as known per se, the tread comprises, in its marginal zones, oblique or transverse blocks separated by deep wide grooves and by the fact that a narrow ply is arranged at least along one of the edges of the additional ply.

9. A tire according to claim 8, characterized by the fact that the narrow ply has a width of between 10% and 30% of the edge-to-edge developed width of the additional ply and forms with the circumferential direction an angle opposite that of the additional ply.

10. A tire according to claim 1, characterized by the fact that, as known per se, the tread comprises, in its marginal zones, oblique or transverse blocks separated by deep wide grooves and by the fact that at least along one of the edges of the additional ply there is arranged an annular reinforcement formed of a very narrow ply of cables inclined by at most 10° with respect to the circumferential direction.

11. A tire according to claim 8 or 9, characterized by the fact that the edge of the additional ply has an annular reinforcement element preferably formed of a very narrow ply, narrower than the narrow edge ply and formed of cables forming an angle of at most 10° with the circumferential direction.

12. A tire according to claim 1, characterized by the fact that for the use of the tire on very heavy carrier vehicles traveling on a road or a prepared track, the angle of the cables of the additional ply at the equator is between 25° and 35° and the angle formed by the cables of the active ply with the cables of the additional ply is equal to 40°±5°.

13. A tire according to claim 1, characterized by the fact that for the use of the tire on vehicles traveling off the road on very rough terrain, the angle of the cables of the additional ply at the equator is between 40° and 60° and the angle formed by the cables of the active ply with the cables of the additional ply is equal to 60°±5°.

* * * * *

UNITED STATES PATENT AND TRADEMARK OFFICE
CERTIFICATE OF CORRECTION

PATENT NO.  : 4,520,856
DATED       : June 4, 1985
INVENTOR(S) : Jean Pommier, deceased It is certified that error appears in the above-identified patent and that said Letters Patent is hereby corrected as shown below:

```
First page, Item 73, "Establissements" should read
--Etablissements--.
Col. 4, line 2, "on" (2nd occurrence) should read --of--;
line 54, "traced" should read --tread--.
Col. 5, line 40, "equal the" should read --equal to---.
```

Signed and Sealed this

Eighth Day of October 1985

[SEAL]

Attest:

Attesting Officer

DONALD J. QUIGG

Commissioner of Patents and Trademarks—Designate